(12) United States Patent
Funahashi et al.

(10) Patent No.: US 6,709,049 B2
(45) Date of Patent: Mar. 23, 2004

(54) OPENING AND CLOSING DEVICE FOR PULL-CABLE TYPE SUNROOF

(75) Inventors: Nobuhiro Funahashi, Takarazuka (JP); Iwao Ujita, Takarazuka (JP)

(73) Assignee: Nippon Cable System Inc., Hyogo (JP)

( * ) Notice: Subject to any disclaimer, the term of this patent is extended or adjusted under 35 U.S.C. 154(b) by 0 days.

(21) Appl. No.: 10/148,582

(22) PCT Filed: Dec. 4, 2000

(86) PCT No.: PCT/JP00/08587

§ 371 (c)(1),
(2), (4) Date: Oct. 7, 2002

(87) PCT Pub. No.: WO01/40006

PCT Pub. Date: Jun. 7, 2001

(65) Prior Publication Data

US 2003/0107245 A1 Jun. 12, 2003

(30) Foreign Application Priority Data

Dec. 3, 1999 (JP) ............................................. 11-344945
Mar. 15, 2000 (JP) ....................................... 2000-071606

(51) Int. Cl.⁷ ................................................ B60J 7/057
(52) U.S. Cl. ...................................................... 296/223
(58) Field of Search ......................................... 296/223

(56) References Cited

U.S. PATENT DOCUMENTS 5,069,502 A * 12/1991 Sekine et al. ............... 296/223

FOREIGN PATENT DOCUMENTS

| DE | 1530848 | * 7/1969 | ................. 296/223 |
|---|---|---|---|
| JP | 58-051052 | 3/1983 | |
| JP | 60-248430 | 12/1985 | |
| JP | 02-027488 | 2/1990 | |
| JP | 03-122917 | 12/1991 | |

OTHER PUBLICATIONS

International Search Report PCT/JP00/08587, mailed on Feb. 27, 2001.

* cited by examiner

Primary Examiner—Dennis H. Pedder
(74) Attorney, Agent, or Firm—Rader, Fishman & Grauer PLLC

(57) ABSTRACT

A opening and closing device 10 for sunroofs of an automobile, which has a pair of rails 17a and 17b, a lid 13 for opening and closing an opening 12, right and left cables 26 engaged to a lid 14 and arranged along the rails 17a and 17b, and a drive mechanism 36 for driving the cables in a reciprocating manner. The cables 26 construct a closed loop arrangement with bypassing the opening 12 of the loof of the automobile. One of the cable 26 coming out of the drive mechanism 36 is arranged to the right-side rails 17b, bridged to the left side lail 17b, reversed at the base end of the left side lail 17a and returned along the same route to the drive mechanism 36.

8 Claims, 14 Drawing Sheets

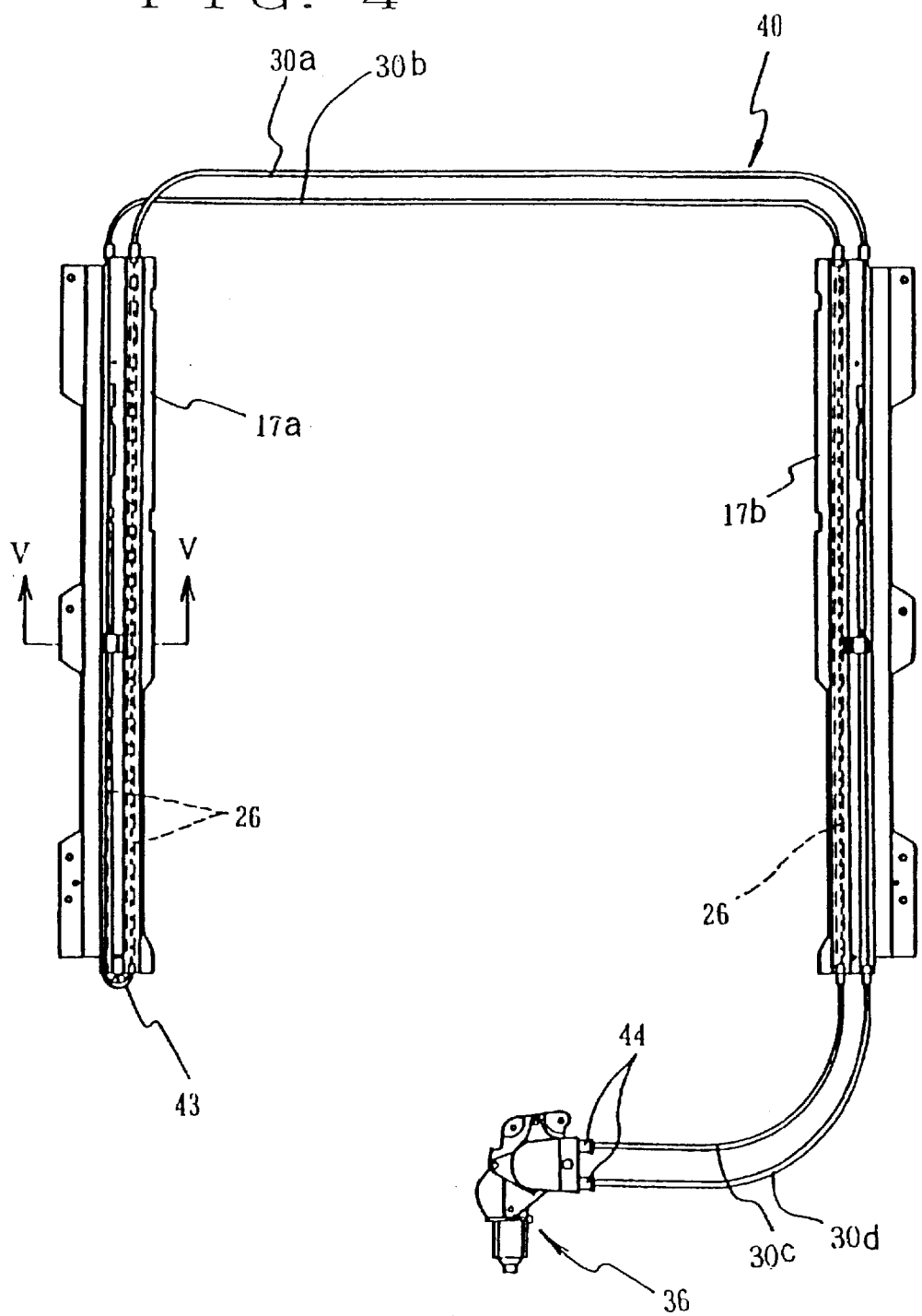

OPENING AND CLOSING DEVICE FOR PULL-CABLE TYPE SUNROOF

BACKGROUND OF THE INVENTION

1. Field of the Invention

The invention relates to a pull-cable type opening and closing device for sunroofs and the like, and to a cable drive mechanism for use in the same.

2. Description of the Related Art

Typically, so-called a geared-cable type opening and closing device has been used for opening and closing an opening in the ceiling of an automobile, such as a sunroof and the like. This opening and closing device has such a construction that, as shown in FIG. 13, it converts a driving force of a motor M via a gear 101 into a reciprocating motion of a right-and-left pair of geared cables 102, to reciprocally drive a roof lid 103 fixed at the tips or the front ends of these geared cables 102 along roof rails 104 in a front and rear directions of the automobile, thus opening and closing an opening 106 in the roof 105. The right-and-left geared cables 102 are guided by guide pipes 107 in a sliding manner.

Japanese Patent Laid-Open Publication No. Hei 3-11924, on the other hand, discloses therein a pull-cable type opening and closing device. As shown in FIG. 14, this type of opening and closing device comprises a pair of drums 110 which are rotary-driven in the right-and-left directions by the motor M, a closed-loop shaped right-and-left pair of pull-cables (wires) 111 which are wound onto these respective drums and sent out to be driven reciprocally and circularly, lid brackets 112 which are coupled somewhere along these respective pull-cables, and rails 113 for guiding these lid brackets back and forth in a sliding manner. To the lid brackets 112 is attached a lid 115 for opening and closing an opening 114. At the tip of each of the rails 113 is attached in a rotating manner a pulley 116 for reversing the direction of the pull-cables 111.

With this, when the drum 110 rotates in an arrow direction, one end of the corresponding pull-cable 111 is wound onto that drum, feeding out the other end. When the right and left pull cables 111 are thus circularly driven in a synchronous manner, the right and left lid brackets move in an arrow direction, to retract the lid 111, thus opening the opening the 114. When the motor M rotates in a reverse direction, the opening is closed similarly.

In the above-mentioned geared-cable type opening and closing device, the guide pipes 107 for guiding the geared cables 102 have rigidity and the motor M for evenly driving the right and left geared cables 102 and the gear 101 need to be provided at a center position between the rails 104, so that the layout has a low degree of freedom. Also, a reaction force of the geared cables 102 is put into the motor M, thus giving rise to a force to cause it to rotate with the gear 101 as a center. This leads to need for providing a motor bracket strong enough to stand that force, thus making the device heavy and expensive in terms of manufacturing cost. Further, sliding sound is raised when the geared cables 102 slide in the guide pipe 107, striking sound is raised when the geared cables return to strike the inner surface of the guide pipe 107, creaking sound is raised at the linking portion between the geared cables 102 and the gear 101, and other working noise is raised loud.

The above-mentioned pull-cable type opening and closing device, on the other hand, has the motor M and the drums 110 provided at the center position between the right and left rails 113, so that it has a low degree of freedom. Moreover, it needs to have the two drums 110 for winding cables onto themselves and driving respective right and left pull-cables 111, so that its drive unit becomes large-sized, thus making it heavy and expensive in manufacturing cost.

In view of the above, it is an object of the present invention to provide an opening and closing device for sunroofs and the like that has a high degree of freedom of the layout of the drive unit and the like, and that is light in weight and inexpensive in manufacturing cost.

SUMMARY OF THE INVENTION

According to the present invention, there is provided a pull-cable type opening and closing device for sunroofs and the like which comprises a pair of rails running in parallel with each other, a lid reciprocating along these rails for opening and closing an opening in a ceiling and the like, right and left pull-cables having ends engaged to the lid and arranged along the rails, and a drive mechanism for reciprocally driving these pull cables, wherein the pull-cables are arranged in a closed loop in which one of pull-cable coming out of the above-mentioned drive mechanism is arranged from the base end side of the first rail to its tip side along the rail, with engaging to the lid at a middle portion thereof, furthere beeing arranged from another end of the first rail to the base end side of the second rail along a route bypassing the opening, then beeing arranged from the base end side of that second rails to its tip side along the rail with beeing engaged to the lid at middle portion thereof, and further beeing arranged from the tip side of the second rail along a route bypassing the opening back to the drive mechanism.

In the case of such an opening and closing device, the pull-cable may be arranged from the tip side of the first rail to the base end side of the second rail along any route as far as they bypass the opening. For example, the pull-cables may be arranged from the tip side of the first rail using a conduit to the tip side of the second rail and then along the second rail to its base end and turned back there, then to the tip side as mentioned above. Also, the route along which the pull-cables are turned back from the tip side of the second rail to the drive mechanism is not limited to the above-mentioned one, so that these pull-cable may be turned back from the tip side of the second rail to the tip side of the first rail using a conduit and then further turned back along the first rail to its base end side, then to the drive mechanism Further, preferably, these bypass routes are combined so that these two pull-cables may be guided between the base end side of the first rail and the drive mechanism using flexible conduits.

Also, as for the bypass route, the above-mentioned pull-cable may be turned back at the tip portion of the first rail and arranged along the first rail to the base end side and then, using a conduit, to the base end side of the second rail or they may be turned back at the tip side of the second rail and, along the second rail, to the end side and then back to the drive mechanism. Further, more preferably, these routes are combined so that the pull-cables may be guided between the base end side of each of these rails and the drive mechanism using conduits having flexibility.

In the case where two pull-cables are to be arranged reciprocally along one rail in any of the above-mentioned constructions, that first rail or second rail is preferably provided with an open cross-sectional portion for passing one of the pull-cables that is engaged with a lid and a closed cross-sectional portion for guiding in a sliding manner the other pull-cable that is not engaged with the lid. In the case of an opening and closing device in which the cables are turned back at the end portion of the rail, preferably, a pulley is provided in a rotary manner at the end portion of the first or second rail for rotating the pull-cables and, near the pulley, a guide is provided for making a spacing between the pull-cables engaged at the pulley smaller than the diameter of the pulley. Further, preferably, at the end portion of the first or second rail, the pulley for turning back the pull-cables is provided in a rotary manner as well as in such a manner as to be adjusted in the rail direction. Also, preferably, the above-mentioned rail having the open cross-sectional portion is provided with an elastonomer-made lip for preventing the chord oscilation or chord vibration of the pull-cable.

A cable drive mechanism according to the invention is a mechanism for driving a pull-cable, in winding and feeding, of a pull-control cable consisting of a pull-cable coupled to a driven member for transmitting pulling force and a conduit standing a compressing force. The cable driving mechanism comprises a housing having a drum therein for winding the pull-cable and driving them, an outer-end, having a stopping portion and a spring-engaging portion, which is provided at the pull-cable inlet/outlet of the housing in such a manner as to be movable in the pull-cable extending direction and also at which the end portion of the conduit is engaged, a spacer disposed between the housing and the outer-end's stopping portion for defining an end of motion of the outer-end toward the housing side, and a compression spring disposed between the spacer and the outer-end's spring-engaging portion.

In such a cable drive mechanism, in a preferable case, the above-mentioned outer-end is a cylindrical member comprising a sliding portion inserted in an axially-movable manner through a hole formed in the housing in a pull-cable arranging direction, a spring holding portion which continues therefrom via a stopping step portion constituting the above-mentioned stopping portion and which has a larger diameter than the sliding portion, and a flange portion constituting the above-mentioned spring-engaging portion, the above-mentioned spacer preferably being a tubular member having a step to be engaged with the outer-end's stopping step portion. Also, preferably, the above-mentioned housing is provided with an engaging step portion to be engaged with the spacer's end portion for aligning the spacer.

The opening and closing device according to the present invention employs pull-cables and so gives rise to lower level of noise. Also, the pull-cable passing along the first rail and the pull-cable passing along the second rail substantially continue with each other, to construct one closed loop, thus requiring only one drive mechanism for circulatory-driving a cable loop, for example, a motor-driven winding drum. This opening and closing device, therefore, is reduced in mounting space, lighter, and more inexpensive in manufacturing cost. Also, it is capable of adjusting cable loosening and tension basically at one position. Moreover, it has a smaller drive mechanism and so has a higher degree of freedom in layout.

The opening and closing device having the pull-cable arranged from the tip side of the first rail to the tip side of the second rail using a conduit and then, along the second rail, to its base end side can safely hold the pull-cables where they are arranged along the second rail, thus having good integrated unit form and being easy to handle. Also, in the case of turning the pull-cables from the tip side of the second rail using a conduit back to the tip side of the first rail and, along the first rail, to its base end and then back to the drive mechanism, the turned-back cable goes along the first rail, thus providing easy handling as a unit. Also, two cables, going and coming back each, couple the first rail's base end portion and the drive mechanism, thus providing a higher degree of freedom in arrangement layout for the drive mechanism.

Also, in the case where the above-mentioned bypass routes are combined to use a flexible conduit to guide the two pull-cables between the first rail's base and the drive mechanism, the first and second rails are coupled at their top ends using two conduits and so are done the first rail's base end side and the drive mechanism, thus providing a further higher degree of freedom of layout. Also, the cables are turned back only at one portion on the base end side of the second rail, thus providing a higher transmission efficiency.

In the case where the above-mentioned pull-cables are turned back at the tip portion of the first rail and arranged along it to the base end side and then, using a conduit, to the base end side of the second rail, the reciprocating two cables can be supported by the first rail, thus providing easy handling. Also, in the case where the pull-cables are turned back at the tip side of the second rail and, along it, arranged back to the base end side and then back to the drive mechanism side, the reciprocating two cables can be supported by the second rail, thus providing easy handling. Further also, in the case where these bypass routes are combined to use flexible conduit for guiding the pull-cables between the base end side of each rail and the drive mechanism, the pull-cables are stretched only at the base end side of the first and second rails, to couple the rails and the drive mechanism with the flexible conduits, thus providing easy handling and a high degree of freedom in layout.

In the case where two cables are arranged to reciprocate along one rail, when the first or second rail is provided with an open cross-sectional portion for passing one of the pull-cables engaged with a lid and a closed cross-sectional portion for guiding, in a sliding manner, the other pull-cable not engaged with the lid (claim 4), the closed cross-sectional portion serves to guide the pull-cable in a sliding manner, thus securely accommodating the reaction force of the pull-cable. With this also, the lid interference resistance and water resistance can be obtained easily.

Further, in the case where an opening and closing device in which the pull-cables are turned back at the rail end portion is provided, at the rail end portion, with a rotary pulley for rotating the pull-cables and, near that pulley, with a guide engaged with that pulley for making the spacing between the pull-cables smaller than the pulley diameter, it is possible to reduce that spacing between the cables while maintaining a large radius of curvature of the pull-cables. With this, the degree of freedom can be improved at the point where the cables are positioned.

In the case where the pulley is provided in a position-adjustable manner in the direction of the rail, it is easy to adjust the cable loosening and tension. Also, in the case where the above-mentioned rail having the open cross-sectional portion is provided, in a contacting manner, with an elastomer-made lip for preventing the chord oscsilation of the pull-cables, the pull-cables vibration can be suppressed, thus reducing the noise.

In the cable drive mechanism according to the invention, if the pull-cable has loosened, the spring urges the outer-end to move away from the housing. With this, the substantial arrangement length of the pull-cable becomes longer so as to absorb the loosening thereof, thus restoring the tension of the pull-cable. Also, a spacer is provided, so that the outer-end can have a longer stroke without changing the spring mounting length. Therefore, even rather the arrangement length of the pull-cable becomes long, for example, a pull-cable type opening and closing device for sunroofs and the like can be accommodated sufficiently. That is, only by exchanging the spacer and the outer-end for an ordinary cable drive mechanism, it can be suitable used as the cable drive mechanism of an opening and closing device for sunroofs and the like.

In the case where the above-mentioned outer-end is a cylindrical member which comprises a sliding portion inserted in an axially-movable manner through a hole formed in the housing in a pull-cable arrengement direction, a spring holding portion which continues therefrom via a stopping step constituting the above-mentioned stopping portion and which has a larger diameter than the sliding portion, and a flange which constitutes the above-mentioned spring stopping portion in such a manner that the above-mentioned spacer is a tubular member having a step to be engaged with the stopping step of the outer-end, the spring is held in the same manner as with a cable drive mechanism using no spacer and so can be shared in use. Also, in the case where the above-mentioned housing is provided with a stopping step engaged with the spacer's end portion for alignment of the spacer, it is easy to align and mount the spacer.

BRIEF DESCRIPTION OF THE DRAWINGS

FIG. 4 is a plan view showing another embodiment of the opening and closing device of the invention;

DESCRIPTION OF THE PREFERRED EMBODIMENTS

The following will describe embodiments of a pull-cable type opening and closing device for sunroofs according to the invention with reference to the drawings.

Figure 1:
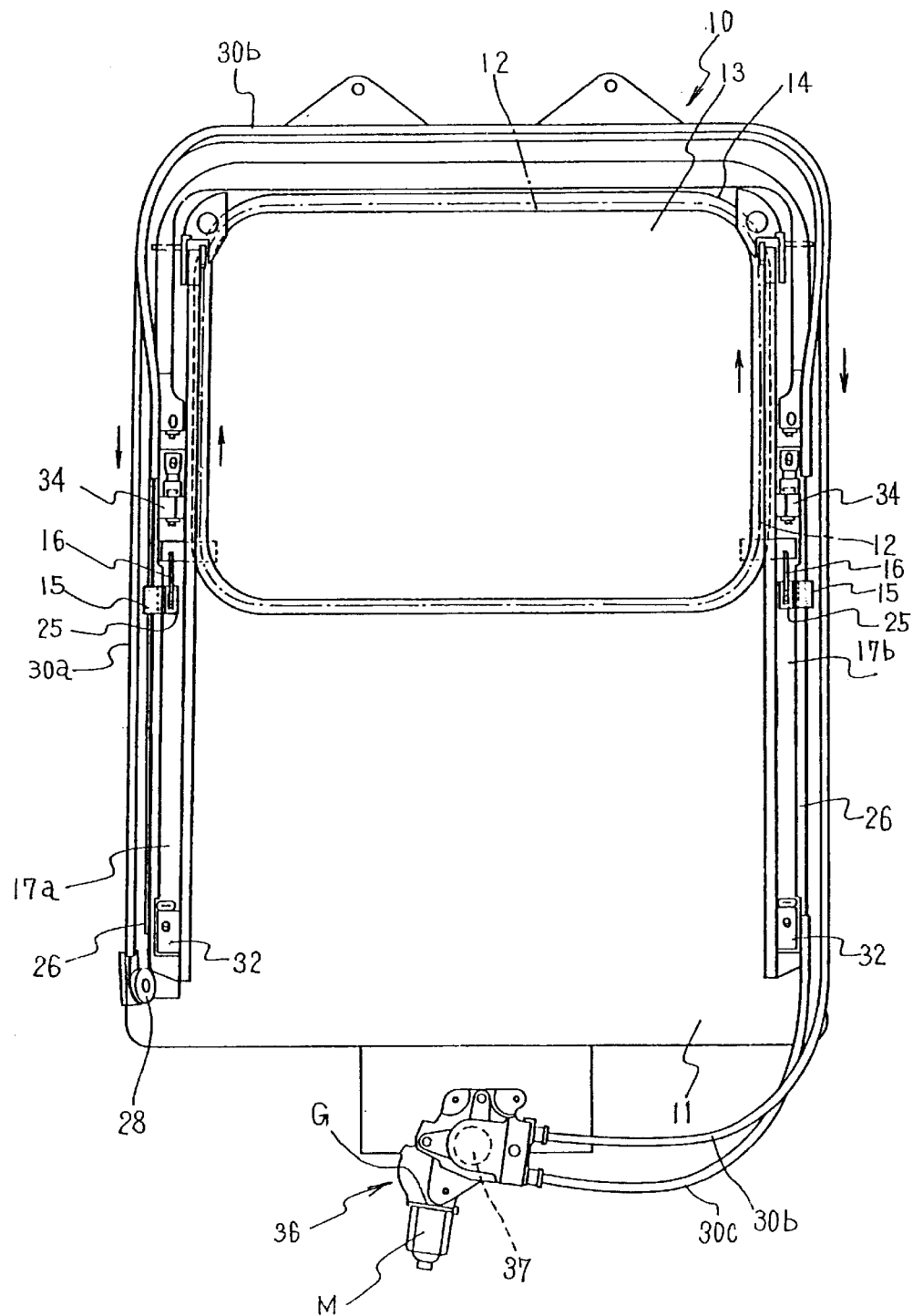
FIG. 1 is a plan view showing one embodiment of an opening and closing device of the invention.

FIG. 1 shows an embodiment of a device for opening and closing a sunroof of an automobile. This opening and closing device 10 comprises a roof plate 11 and a lid (roof lid) 13 for closing an opening formed in the roof plate. The lid 13 has, for example, a glass-made rectangular member, a sash 14 surrounding the glass plate, and carriers 15 attached through a link 16 to the sash 14. The roof plate 11 has, on its opposite sides, a right-and-left pair of rails 17a and 17b for guiding the respective carriers 15 in a sliding manner. The carriers 15 may be provided with a rotary member, such as a roller, which moves along the rails 17a and 17b in a rotary manner.

Figure 3A:
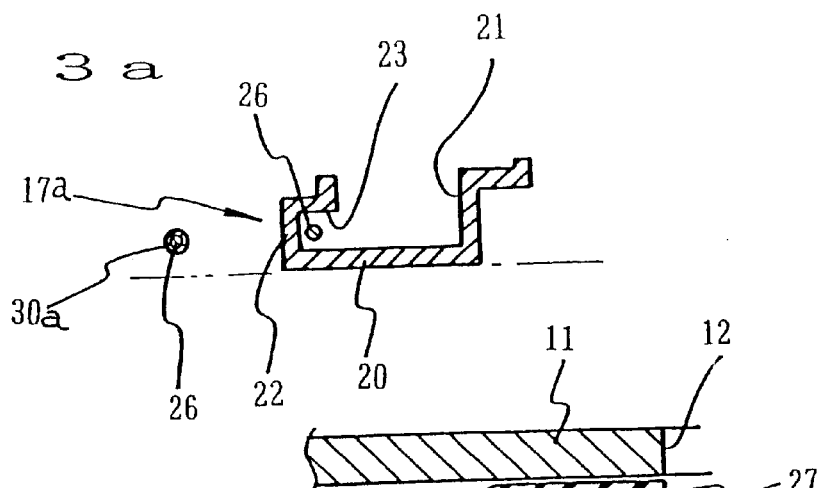
FIGS. 3a and 3b are cross-sectional views taken respectively along IIa—IIa and IIb—IIb of FIG. 2

As shown in FIG. 3a, the rails 17a and 17b are each a channel-shaped elongated member having a base portion 20 and an inner wall 21 and an outer wall 22 which rise respectively from the inner side and the outer side of the base portion. The channel has therein a space in which the carrier passes through. The outer wall 22 has therein an inserting groove 23 having a U-shape in cross-section for passing the cables.

Figure 3B:
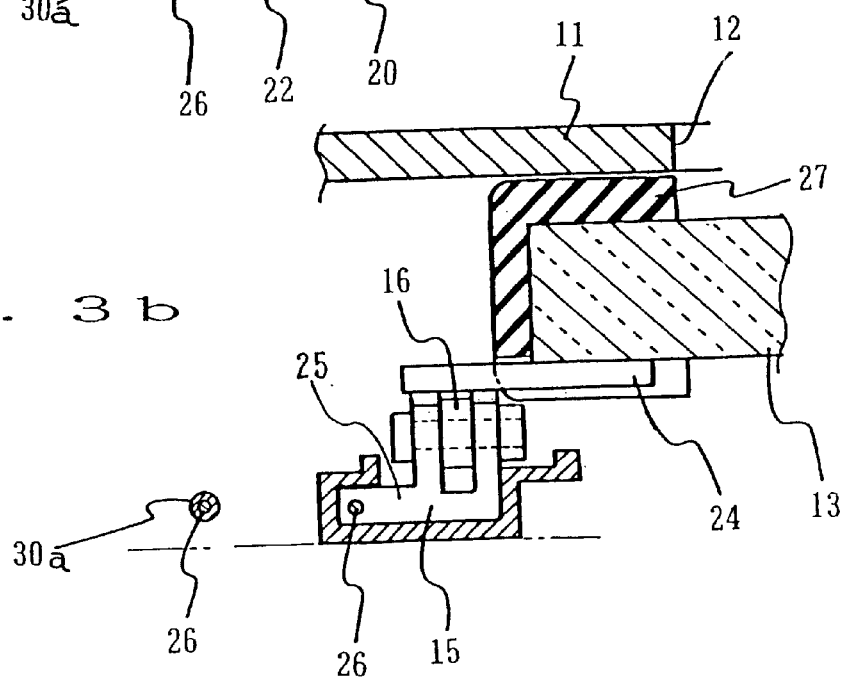
Figure 3C:
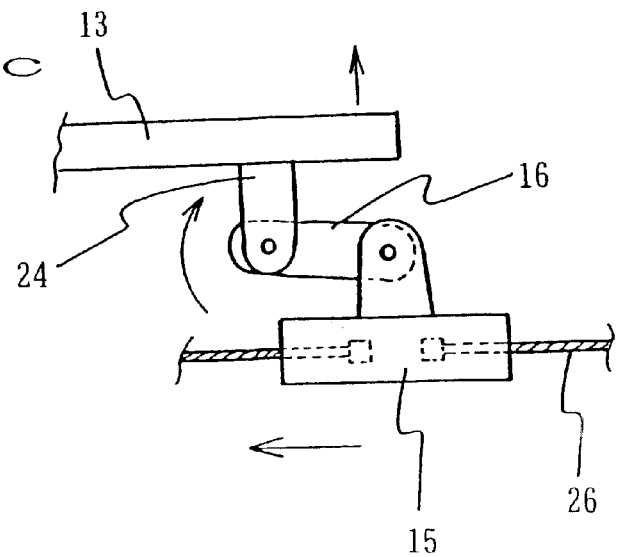
FIG. 3c is a side view of a tilt-up mechanism of FIG. 3b.

As shown in FIGS. 3b and 3c, the lid 13 has on its bottom face a bracket 24 fixed thereto, and a link 16 is rotatably jointed to the brachket at an end thereof. The other end of the link 16 is coupled to the carrier 15 in a rotary manner. The carrier 15 comprises an arm 25 coupled to a cable 26 passing through the inserting groove 23. The arm 25 serves to couple the carrier 15 in the channel and the cable 26 in the inserting groove 23 with each other. The link 16 constitutes a tilt-up mechanism which turns in an arrow direction in FIG. 3c to tilt up the lid 13 when the lid 13 is closed fully. The sash 14 has on its top face a rubber lining 27, which serves to overlap with the opening 12 to seal the gap between the lid 13 and the roof plate 11 when the lid 13 is closed fully and tilted up by the tilt-up mechanism.

Figure 2:
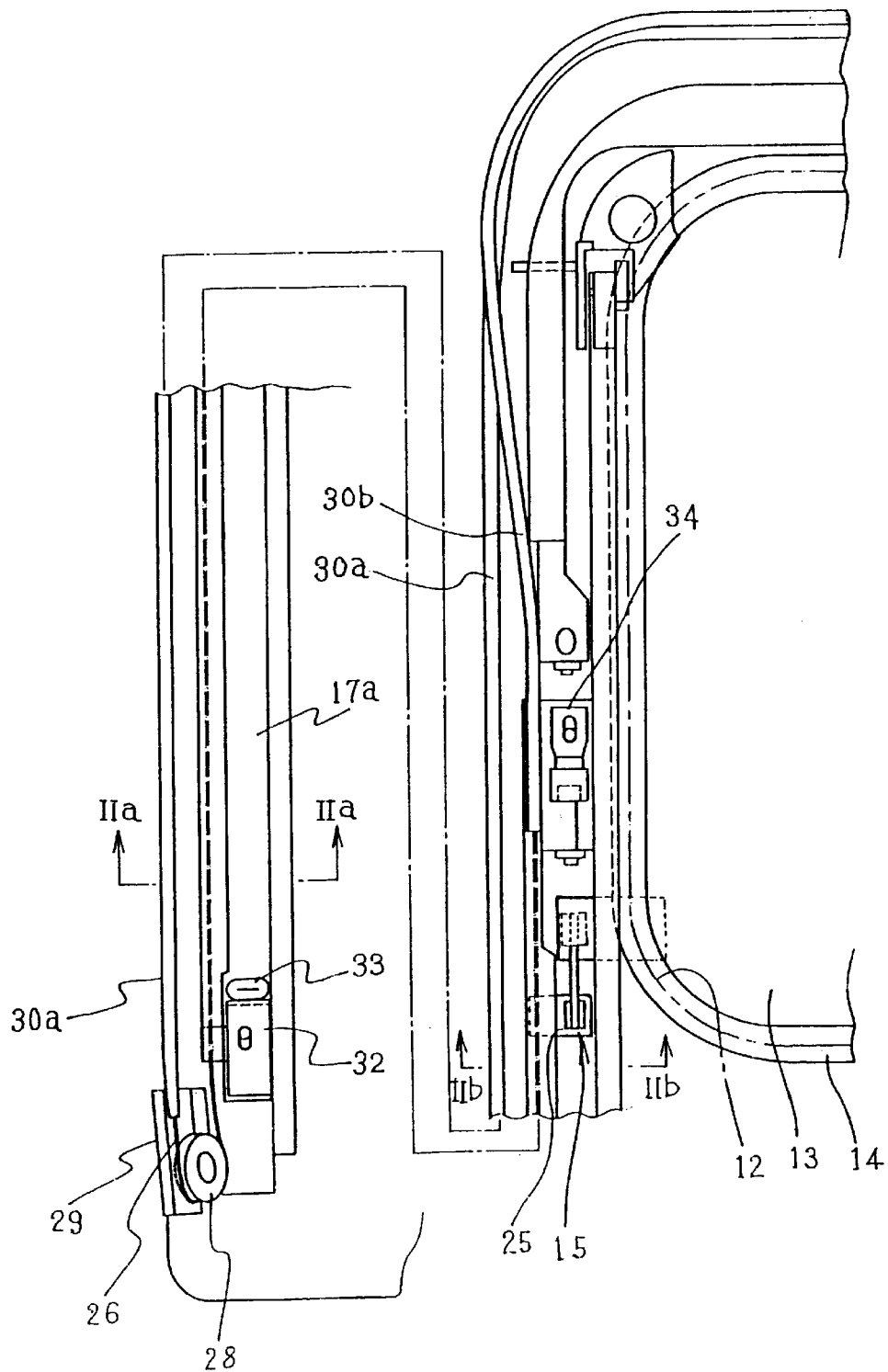
FIG. 2 is an expanded view of an important portion of FIG. 1.

As shown at the lower left in FIG. 2, near one end of the left-side rail 17a is provided a pulley 28 in a rotary or guiding manner for changing the direction of the cable 26. In this embodiment, the pulley 28 has an inclined axis, so that a bracket 29 supporting the pulley 28 is inclined with respect to the rail 17a and the lid 13. With this, the space can be saved. To the bracket 29 is mounted an end portion of a first conduit 20a for guiding the cable 26 in a sliding manner. The conduits, including second and third conduits described later, are so-called pull-control cable conduits. Each conduit is somewhat flexible and has a spiral tube formed by coiling a metal wire, a tubular liner made of a synthetic resin inserted in the spiral metal and a synthetic-resin coating on the outer side of the spiral metal. The cable 26 can use a flexible inner lanyard constituting a pull-control cable together with the conduit. The cable 26 consists of twisted metal strands and so is capable of transmitting a pull-directional force fully but not a push-directional force sufficiently. With this, the cable 26 is much more flexible than a geared cable provided with a spiral tooth.

A reference number 32 in FIG. 2 indicates a stopper for regulating the movement of the sliding end of the lid 13 on its opening side, including a rubber-made cushion 33. A reference number 34 indicates a stopper for regulating the movement of a sliding end on the opening-closing side. Near the stopper 34 is attached one end of a second conduit 30b.

In FIG. 1, the right-side rail 17b of the opening and closing device 10 is basically the same as the left-side rail 17a in FIG. 2. A difference is that the pulley 28 is not provided. Near the opening-side stopper 32 is provided one end of a third conduit 30c. At the tips of the two extending conduits 30b and 30c is coupled a cable drive mechanism (hereinafter called as "drive mechanism" simply) 36. The drive mechanism 36, publicly known conventionally, comprises a motor M having a built-in reduction gear G and a drum 37 for alternately winding the ends of the two cables and feeding them out.

The following will describe, with reference to FIG. 1, a arranging route for the cable 26 going out of and coming back to the drive mechanism 36. First, the cable 26 coming out of the drive mechanism 36 is guided by the third conduit 30c to an opening-side end (hereinafter called base end side) of the right-side rail 17b. Then, the cable 26 enters the inserting groove (see a reference number 23 in FIG. 3a) in the rail 17b and comes out at the other end. In the inserting groove 23, the cable 26 is stretched tight in s space and, somewhere along it the right-side carrier 15 is coupled. The cable 26, after coming out of the inserting groove 23, is guided by the first conduit 30a and passes above the opening 12 with bypassing the opening 12. Further, the cable 26 extends along the left-side rail 17a up to the base end side from the upper side (hereinafter called as "tip side") in the figure. The cable 26, after coming out of the first conduit 30a, is reversed upward in direction by the pulley 28, passed through the inserting groove 23 from the base end side of the left-side rail 17a, arranged upward, and comes out of the tip side. Somewhere along this route, the left-side carrier 15 is coupled. The cable 26, after thus coming out of the tip side, is guided by the second conduit 30b, passed above the opening 12, arranged along the right-side rail 17b from its tip side to its base end side, and guided by the second conduit 30b back to the above-mentioned drive mechanism 36. In this embodiment, the conduits 30a and 30b given along the rails 17a and 17b correspond to the closed cross-sectional portion of claim 4, and the inserting groove 23 corresponds to the open cross-sectional portion respectively of claim 4.

As mentioned above, the cable 26 comes out of the drive mechanism 36 and circulate along the rails 17a and 17b and then returns to the drive mechanism 36, thus constituting a closed loop. When, thus, the motor M of the drive mechanism 36 rotates in one direction to wind an end of one of the cables 26 onto the drum and feed out an end of the other cable 26, the loop circulates along the route. With this, the right-and-left pair of carriers 15 move along the rails 17a and 17b respectively, for example, in such a direction (downward in FIG. 1) as to move the lid 13 to open the opening 12. If the motor M rotates in a reverse direction, on the other hand, the loop of the cables 26 circulates in a reverse direction, to move the lid 13 in such a direction (upward in FIG. 1) as to close the opening 12. When the opening 12 is closed fully, the tilt-up mechanism causes to it come in close contact with the under face of the loof plate 11, thus sealing it.

During the above-mentioned operations, the cable 26 is subject only to tension but not to compression. The tension on the cable 26 is supported by the compression-resistant force of the conduits 30a through 30c. Also, at the curve, an inward force coming from the tension on the cable 26 is supported by the conduits 30a through 30c and finally by the supporting force of the end portion of the conduits. At a side where the cable 26 is reversed in direction by the pulley 28, tension on the cable 26 is supported by the bracket 29 via a shaft supporting the pulley 28.

Although in the above, the cables 26 have together been described as one cable, the cable 26 may be divided to some parts, for example, at the carrier 15. In this case, the cables 26 may be divided into three parts: a driving cable coming out of the drive mechanism 36 having its one end coupled to the carrier 15 of the right-side rail 17b, a coupling cable having its one end coupled to that carrier 15 and the other end coupled to the carrier 15 of the left-side rail 17a, and a returning cable which returns from that carrier 15 back to the drive mechanism 36. In the case of a reverse direction of driving, the returning cable functions as a driving cable, and the driving cable functions as a returning cable.

In the case of the above-mentioned opening and closing device 10, the drive mechanism 36 is jointed to the right-side rail 17b through the two conduits 30b and 30c arranged in parallel with each other, thus providing a higher degree of freedom of the drive mechanism 36. With this, in an automobile, for example, the drive mechanism 36 can be shifted not only to the rear of the roof but also into its trunk or to the underside of its seat or to such a site as to be blocking nothing. Also, between the right and left rails 17a and 17b, only the two conduits 30a and 30b must be bridged in parallel with each other, thus providing easy mounting. Also in the case where the right and left rails 17a and 17b, the conduits 30a through 30c, the cables 26, and the drive mechanism 36 are all handled as a unit, they make together one elongated unit, to provide easy handling. Further, when the rails 17a and 17b are overlapped one on the other, the device can be stored and carried in a further compact manner.

Figure 5:
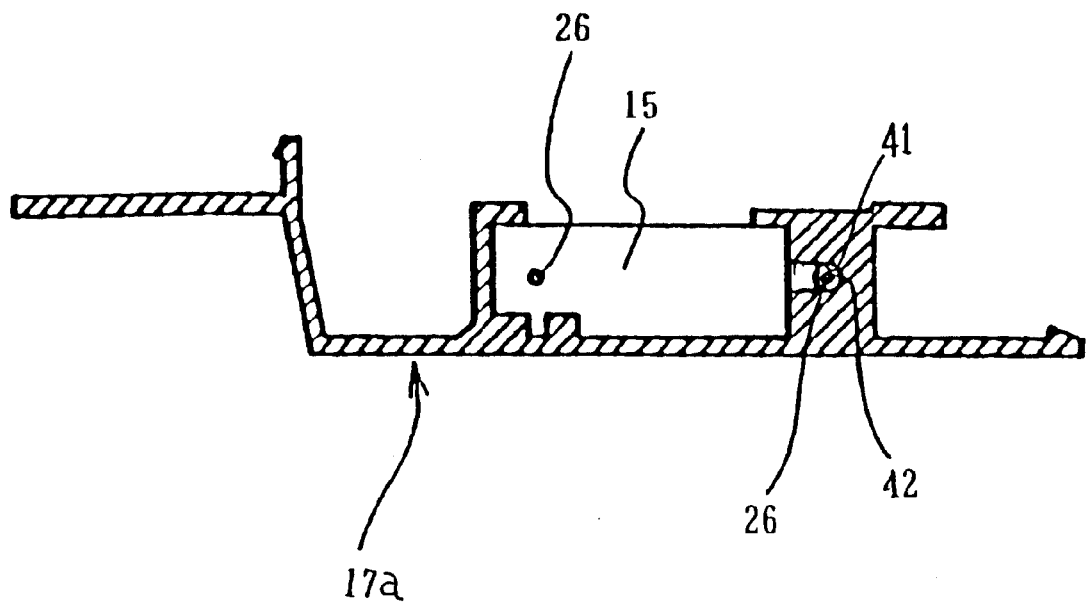
FIG. 5 is a cross-sectional view taken along V—V of FIG. 4.

The following will describe another embodiment of the opening and closing device with reference to FIGS. 4 and 5. A opening and closing device 40 shown in FIG. 4 employs at portions along the right and left rails 17a and 17b not a conduit but a through hole 41 formed in the rails 17a and 17b and a liner 42 housed in the through hole 41. In the liner 42 is housed a coupling cable or returning cable. The liner 42 is a tube made of a synthetic resin and is almost the same as that housed in a pull-control cable conduit. Also, the cable 26 coupled to the carrier 15 is not housed in the inserting groove in the rails 17a and 17b but is only stretched in a space in which the carrier 15 slides. Also, in place of the pulley 28 shown in FIG. 28, a circular arc-shaped guide 43 in sliding contact with the cable 26 is employed to reverse the direction of the cable 26. In this embodiment, the inner space of the rails 17a and 17b corresponds to the open cross-sectional portion and the through hole 41, to the closed cross-sectional portion.

As shown in FIG. 4, the upper ends of the right and left rails 17a and 17b are only jointed by the two conduits 30a and 30b and also the lower end of the right-side rail 17b and the drive mechanism 36 are only coupled with other two conduits 30c and 30d. Therefore, the conduits are short in length than those of the opening and closing device shown in FIG. 1, thus providing easier assembly work and more inexpensive manufacturing cost. Also, at the rails 17a and 17b, the rails can support the reaction force against the tension on the cables 26, thus enabling cable supporting with a higher degree of rigidity.

In either of the above-mentioned opening and closing devices 10 and 40, the cable 26 has initial loosening or post-long-service elongation, so that preferably a cable tension adjusting mechanism is provided. As this mechanism, such a conventionally known tension-adjusting mechanism (indicated by a reference number 44 in FIG. 4) may be employed that comprises, for example, an outer-cap disposed in a free sliding manner in a arranging direction with respect to the drive mechanism 36 and a spring for energizing the outer-cap in an arranging direction in which the conduit may be elongated in arrangement length. These opening and closing devices 10 and 40, however, have a considerably long arrangement length of the cable. With this, more preferably, at a site where the ends of the cables 26 are attached to the rails 17a and 17b, such a tension-adjusting mechanism is provided for urging the conduits 30c and 30d as to elongate their arrangement length. Moreover, it is preferable that a tension-adjusting mechanism is provided so as to shorten the cable arrangement length at each carrier 15 which couples the ends of the cables 26 or somewhere along the cable 26.

Figure 6A:
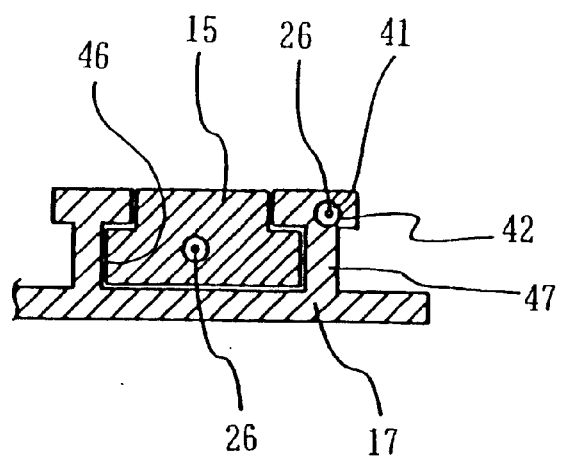
FIGS. 6a, 6b, and 6c are cross-sectional views showing important portions of further another embodiment of the opening and closing device of the invention.

FIG. 6a shows further another embodiment of an assembled state of the rail 17 and the carrier 15 as well as that of the arrangement of, for example, the returning cable along the rail. In FIG. 6a, the rail 17 has a T-shaped groove 46 so that the carrier 15 may slide as a slider therein. With this, the working cable 26 passes through the center of the carrier 15 and is anchored at the carrier 15 somewhere along itself. Note here that the ends of the two cables may be anchored at their respective carriers 15. Further, like in the case of FIG. 5, the through hole 41 is formed in a right-side protruding strip 47 of the rail 17 to pass the liner 42 therethrough, thus serving as a conduit. This also has the same working effects as the opening and closing device 40 shown in FIGS. 4 and 5.

Figure 6B:
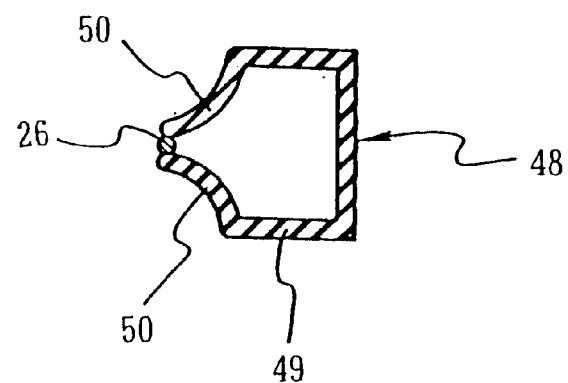

FIG. 6b shows a chord ocsilation-preventing member 48 provided in the case where the cable 26 is stretched in the space in which the carrier 15 moves around, like in the case of the opening and closing device shown in FIG. 6a. This chord oscilation-preventing member 48 comprises an elongated U-shaped frame 49 and flat plate-shaped lips 50 which can be elastically deformed to extend from the tip of the frame 49 in a mutually facing manner. This chord oscilation-preventing member 48 can be made by, for example, extruding rubber or elastomer such as a soft synthetic resin. The chord oscilation-preventing member 48 is disposed in the rail 17, to sandwich the cable 26 between the tips of the lip 50. Therefore, vibration of the cable 26, if any, can be suppressed immediately by the lip 50, thus preventing noise from being raised. Note here that the carrier 15 advances as pushing the lip 50 open, so that the lip 50 does not block the advancing.

Figure 6C:
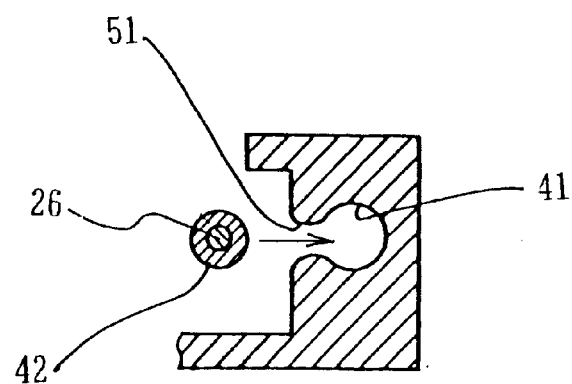

FIG. 6c shows a case where a communicating groove 51 is formed in the through hole 41 formed in the rails 17, to communicate with the internal part of the channel. The communicating groove has such a width that the cable 26 can be inserted therein laterally as passed through the liner 42. As such, the communicating groove 51 permits the liner 42 and the cable 26 to be easily inserted into the through hole 41. With this also, construction is easy at an installation site, thus making it possible to conveniently store and carry the rail 17 and the cable 26 separately from each other.

Figure 7:
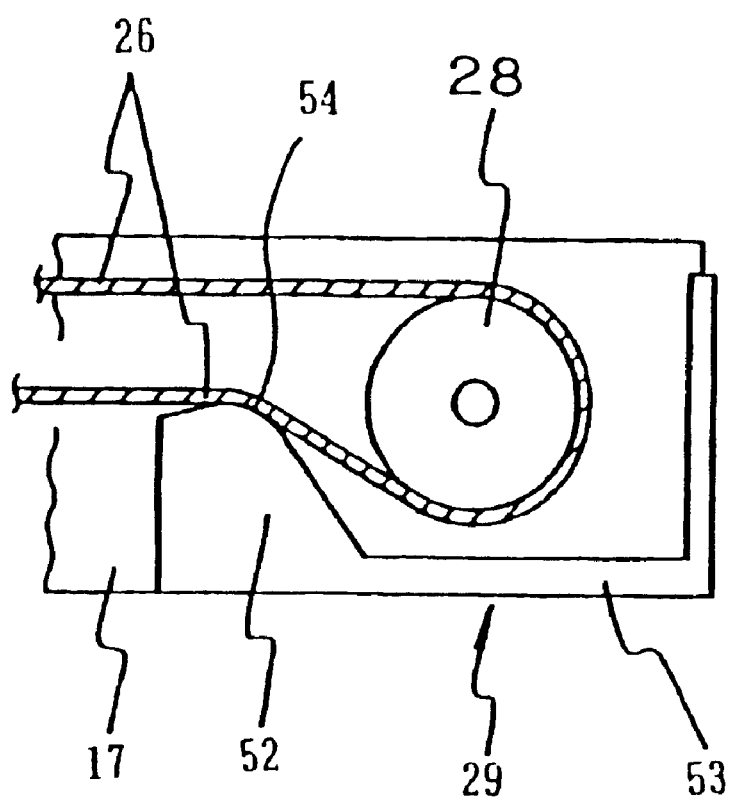
FIG. 7 is a plan view showing an important portion of a further another embodiment of the opening and closing device of the invention.

FIG. 7 shows a further another embodiment around the pulley 28 of the opening and closing device 10 of FIG. 1. In this embodiment, the bracket 29 to be attached to the rail 17 is provided with a guide 52 for changing the cable direction to some extent. This guide 52 protrudes from a frame body 53 toward the center of the pulley 28, with its tip portion 54 being circular arc-shaped so as to smoothly slide with the cable 26. The guide 52 is made together with, for example, the frame body 53 using a synthetic resin etc. This guide 52 is used to guide the cables 26 reversed in direction as engaged with the pulley 28 toward the cable 26 before it is engaged with the pulley 28, thus making it possible to reduce the spacing between the cables 26. With this, it is unnecessary to make the width of the rail 17 so large. Note here that in this embodiment, since the spacing between the two cables 26 is small, the pulley 28 need not be supported with its axis inclined as shown in FIG. 1 but can be arranged in the same plane. The pulley 28, however, can be supported also with the axis inclined as shown in FIG. 1.

Figure 8:
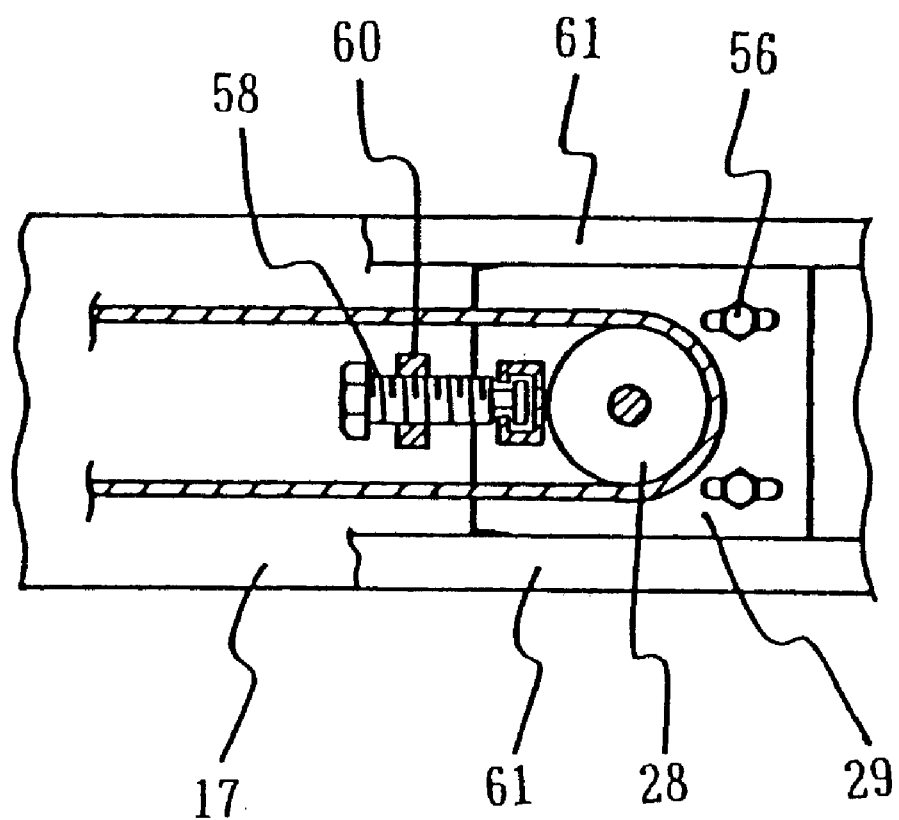
FIG. 8 is a plan view showing an important portion of a further another embodiment of the opening and closing device of the invention.

In a further another embodiment shown in FIG. 8, the bracket 29 which holds the axis for supporting the pulley 28 in a rotary manner is movably provided in a cable arranging direction with respect to the rail 17 and fixed thereto using a fixture screw 56. Also, a push screw 58 for moving the bracket 29 in such a direction as to elongate the arrangement length of the cable 26 is driven into and fixed to a supporting member 60 protruded to the rail 17. A reference number 61 indicates a guide for regulating the motion of the bracket 29.

With this, if the cable 26 has initial loosening or post-long-service loosening, such loosening can be absorbed by loosening the fixture screw 56 and turning the push screw 58 in order to elongate the arrangement length of the cable 26, thereby recovering the cable tension. That is, the pulley 28 and the bracket 29 serve as a cable tension adjusting mechanism. Note here that in place of the push screw 58, a pull screw may be used on the opposite side.

Although the opening and closing devices 10 and 40 shown in FIGS. 1 and 4 respectively have two cables 26 arranged in parallel with each other which are reversed in direction at the pulley 28 or the guide 43, the opening and closing device of the invention is not limited thereto. That is, only one of the two cables 26 arranged along the rails 17a and 17b that is coupled with the carrier 15 essentially drives the lid reciprocally. The other cable arranged along the rails or the cable that bridges the spacing between the rails 17 serves only as a power transmitting portion which couples their working portions and the drive mechanism. Therefore, originally an arbitrary arrangement route can be employed as far as it bypasses the opening that is opened and closed by the lid.

Figure 9:
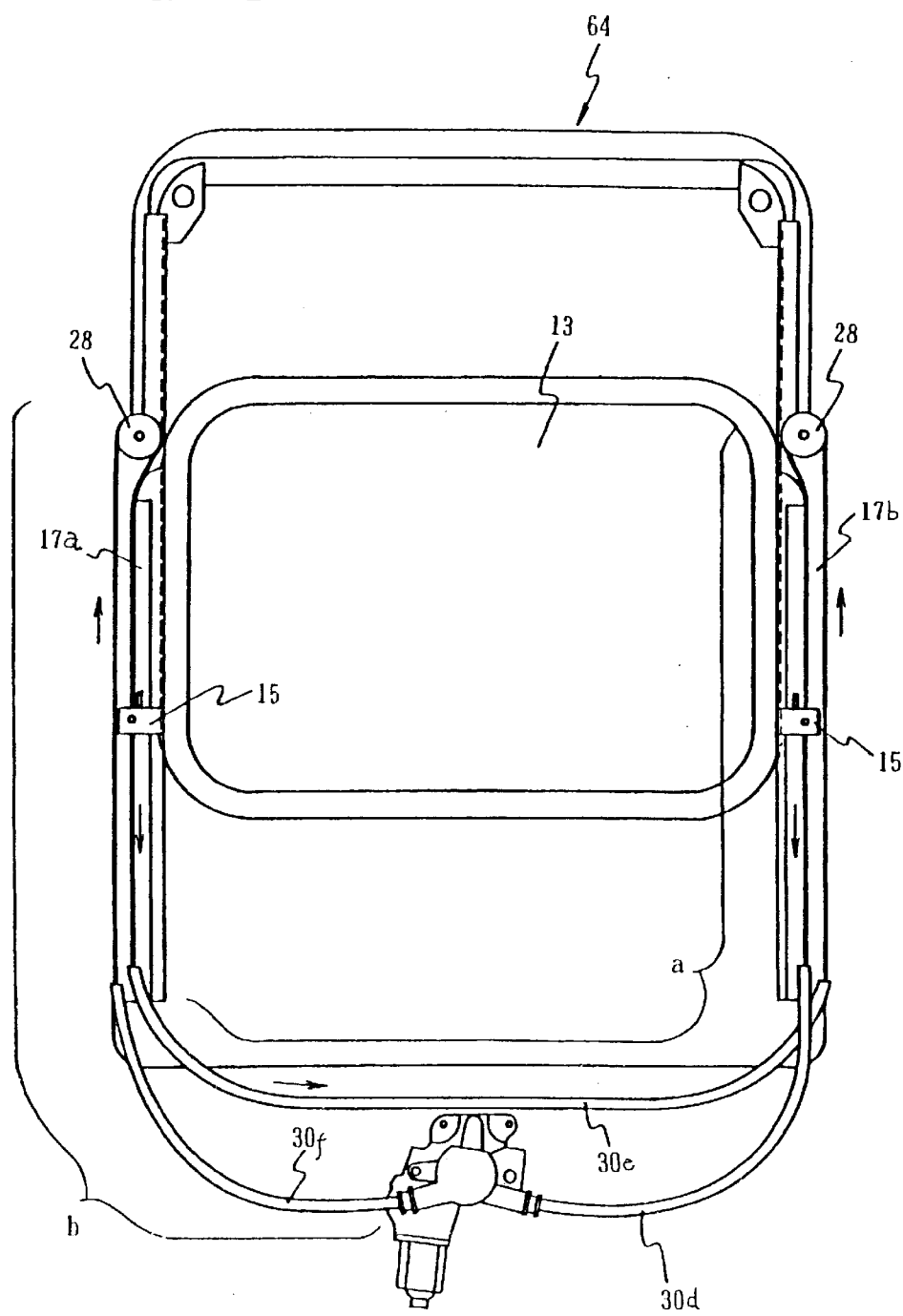
FIG. 9 is a schematic plan view showing another embodiment of the distributing route of the opening and closing device of the invention.
Figure 10:
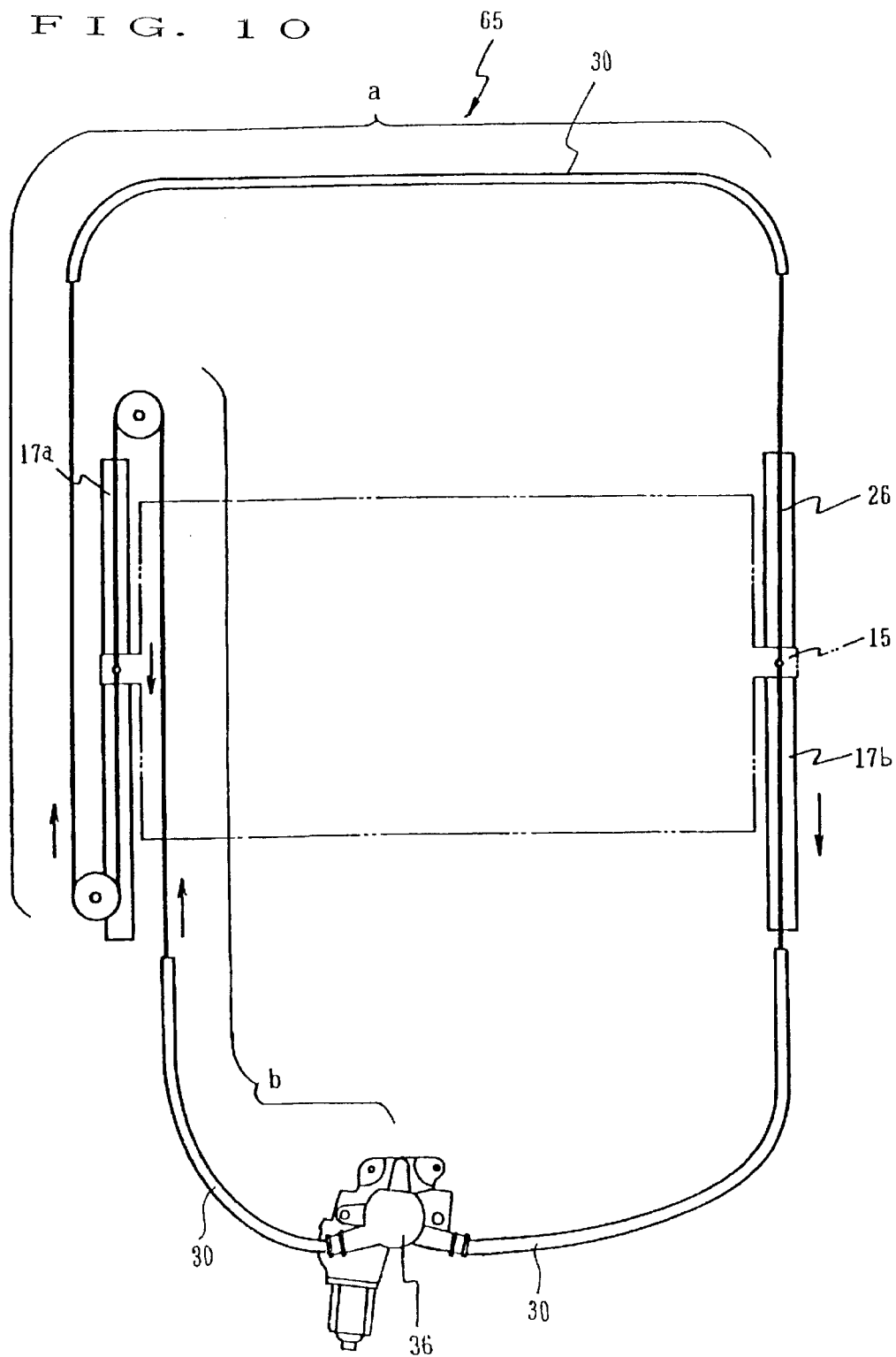
FIG. 10 is a schematic plan view showing further another embodiment of the distributing route of the opening and closing device of the invention.
Figure 11:
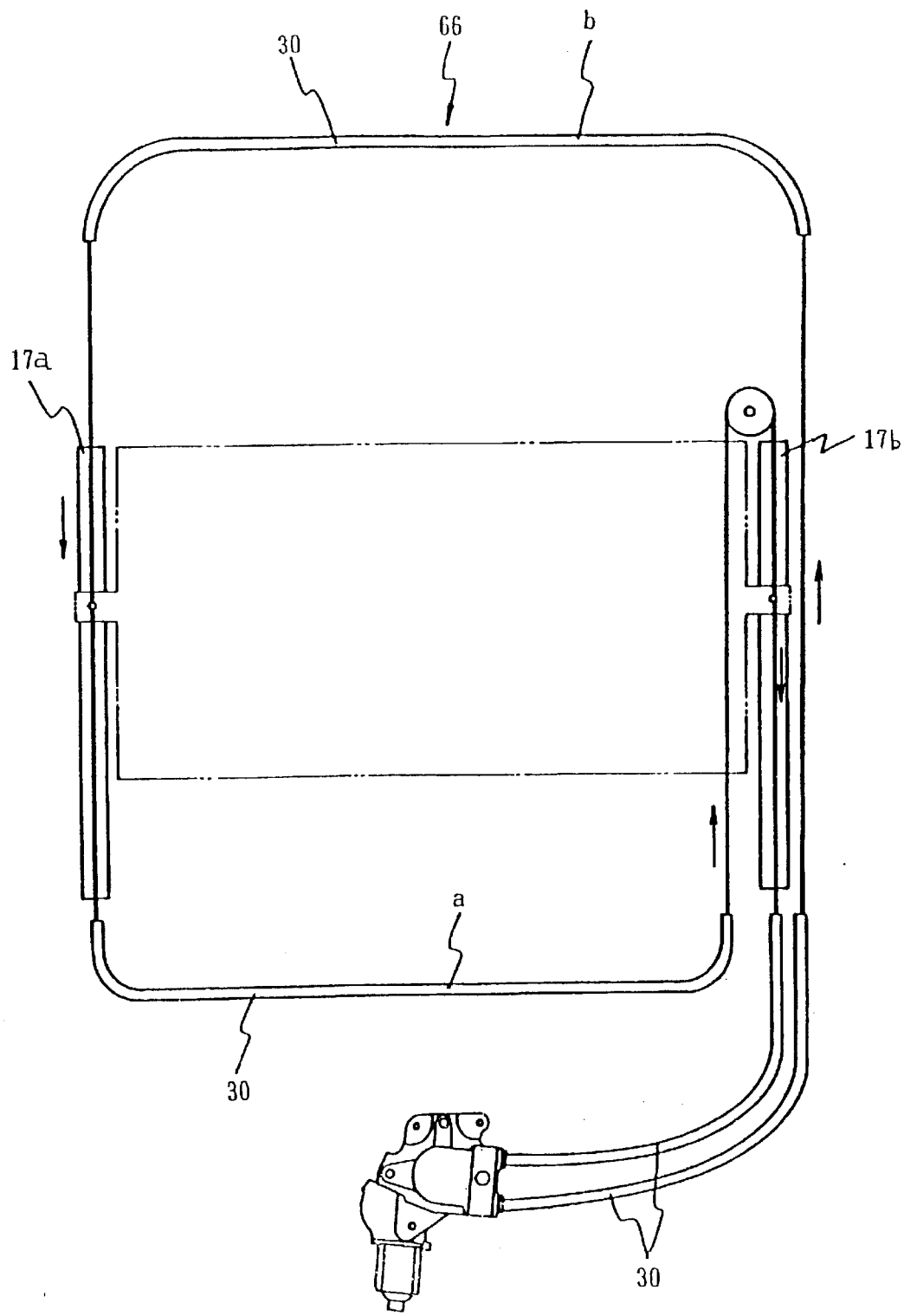
FIG. 11 is a schematic plan view showing further another embodiment of the distributing route of the opening and closing device of the invention.

FIGS. 9–11 show embodiments wherein other arrangement routes are employed for a portion that transmits a power. A opening and closing device 64 is shown in FIG. 9 in such a case where an arrangement route "a" from the tip side of the right-side rail 17b to base end side of the left-side rail 17a and a arrangement route "b" from the tip side of the left-side rail 17a to the drive mechanism 36 bypassed the opening by passing the lower side (in the same way in the figure as the following) thereof. This opening and closing device 64 has the pulley 28 provided at the tip sides of the right and left rails 17a and 17b which serves to reverse the cables 26 in direction. The cable 26, after coming out of the drive mechanism 36, is guided by the right-side conduit 30d to the base end side of the rail 17b and, along the rails 17b, extends upward. Somewhere along it, the carrier 15 is coupled. The cable 26 is reversed in direction by the pulley 28 and then extends downward along the rail 17b, to be guided by the bridging conduit 30e and guided to the base end side of the left-side rail 17a. Then, the cable 26 extends upward along the left-side rail 17a and, somewhere along it, the carrier 15 is coupled. Then, the cable 26 is reversed again in direction at the pulley 28 on the tip side of the left-side rail 17a and guided along the rail 17a to the base end side and returned along the returning conduit 30f back to the drive mechanism 36.

This arrangement route may be considered to be such that the arrangement route of the opening and closing device 10 in FIG. 1 is turned upside down and that the drive mechanism 36 is provided somewhere along one of the two bridging conduits. However, the drive mechanism 36 coupled via the two conduits 30b and 30c to the base end side of the right-side rail 17b shown in FIG. 1 is eliminated, so that in place of that the pulley 28 is provided. This construction has a restricted degree of freedom in layout of the drive mechanism 36 as compared to that shown in FIG. 1 but still has a higher degree of freedom in layout than the case of a geared cable. Further, the construction provides the same working effects of the simpler mechanism portion of the drive mechanism 36 and the mounting bracket. Note here that the tilt-up mechanism is omitted for the opening and closing device 64 in FIG. 9.

A opening and closing device 65 in FIG. 10 has the same arrangement route "a" from the tip side of the right-side rail 17b to the base end side of the left-side rail 17a as that in FIG. 1 and the same returning arrangement route b from the tip side of the left-side rail 17a to the drive mechanism 36 as that in FIG. 9. Also, an opening and closing device 66 shown in FIG. 11 has the same arrangement route a from the tip side of the right-side rail 17b to the base end side of the left-side tail 17a as that in FIG. 9 and the same returning arrangement route "b" from the tip side of the left-side rail 17a to the drive mechanism 36 as that in FIG. 1. In the case of these opening and closing devices 65 and 66, the tip sides of the rails 17 are also coupled with the conduit 30, so that they are not easy to handle as compared to the opening and closing devices 10 and 64 shown in FIGS. 1 and 9 respectively but have a higher degree of freedom than the case of geared cables and also have the same working effects of the simpler mechanism portion of the drive mechanism 36 and the mounting bracket.

As described above, an arbitrary arrangement route can be employed as far as the opening can be bypassed as for the working portions coupled simply with the carrier or the power transmitting portions coupling the working portions and the drive mechanism. Over a range where the cables are arranged from one end to the other of the rails 17a and 17b, however, arrangement along the rails them provides easy handling. In particular, arrangement through the through hole formed in the rails 17a and 17b has an advantage of saving on the conduits, so that the cables are preferably arranged along the rails over that range.

Figure 12:
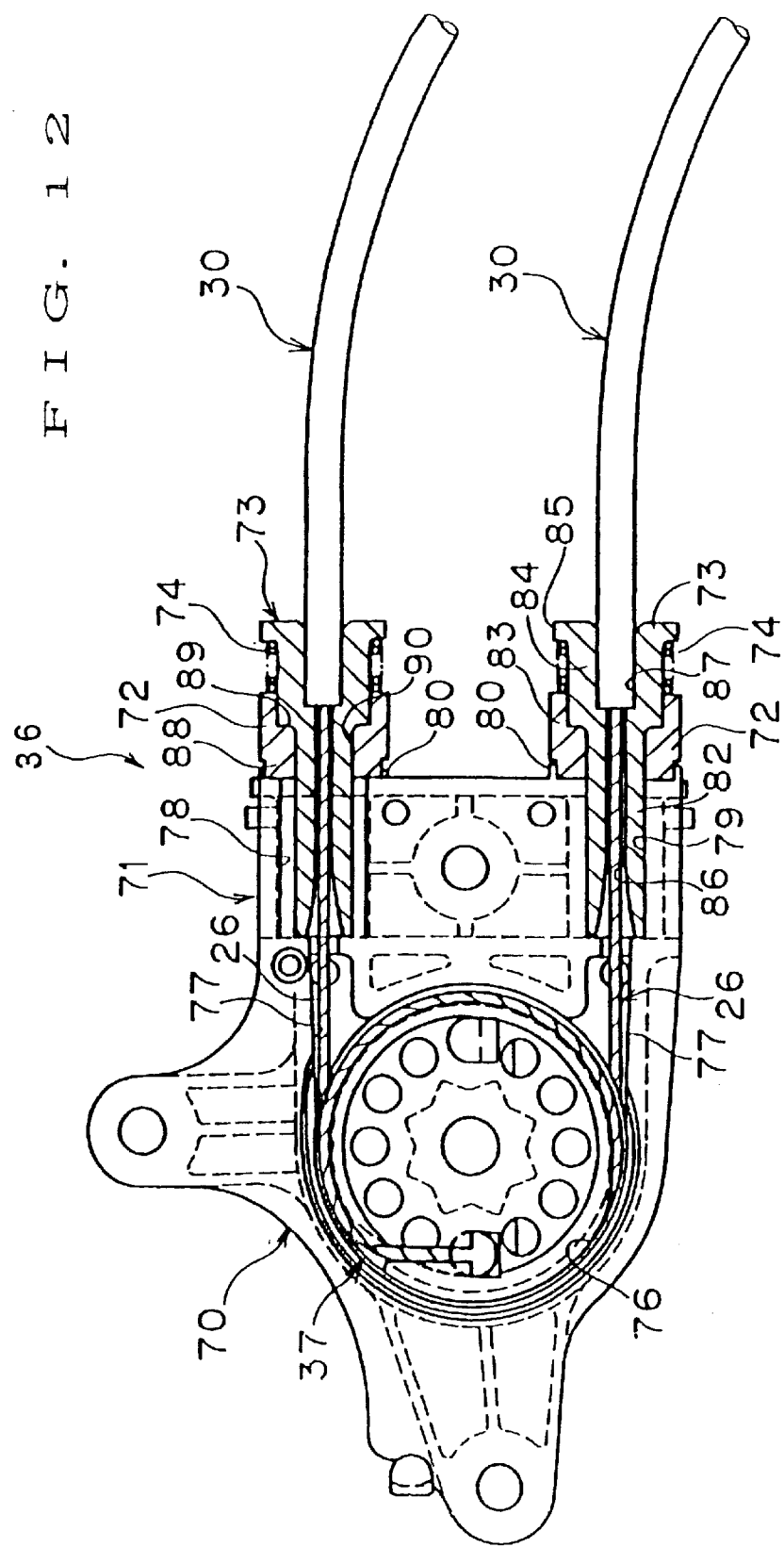
FIG. 12 is a cross-sectional view showing an embodiment of a cable drive mechanism of the invention.
Figure 13:
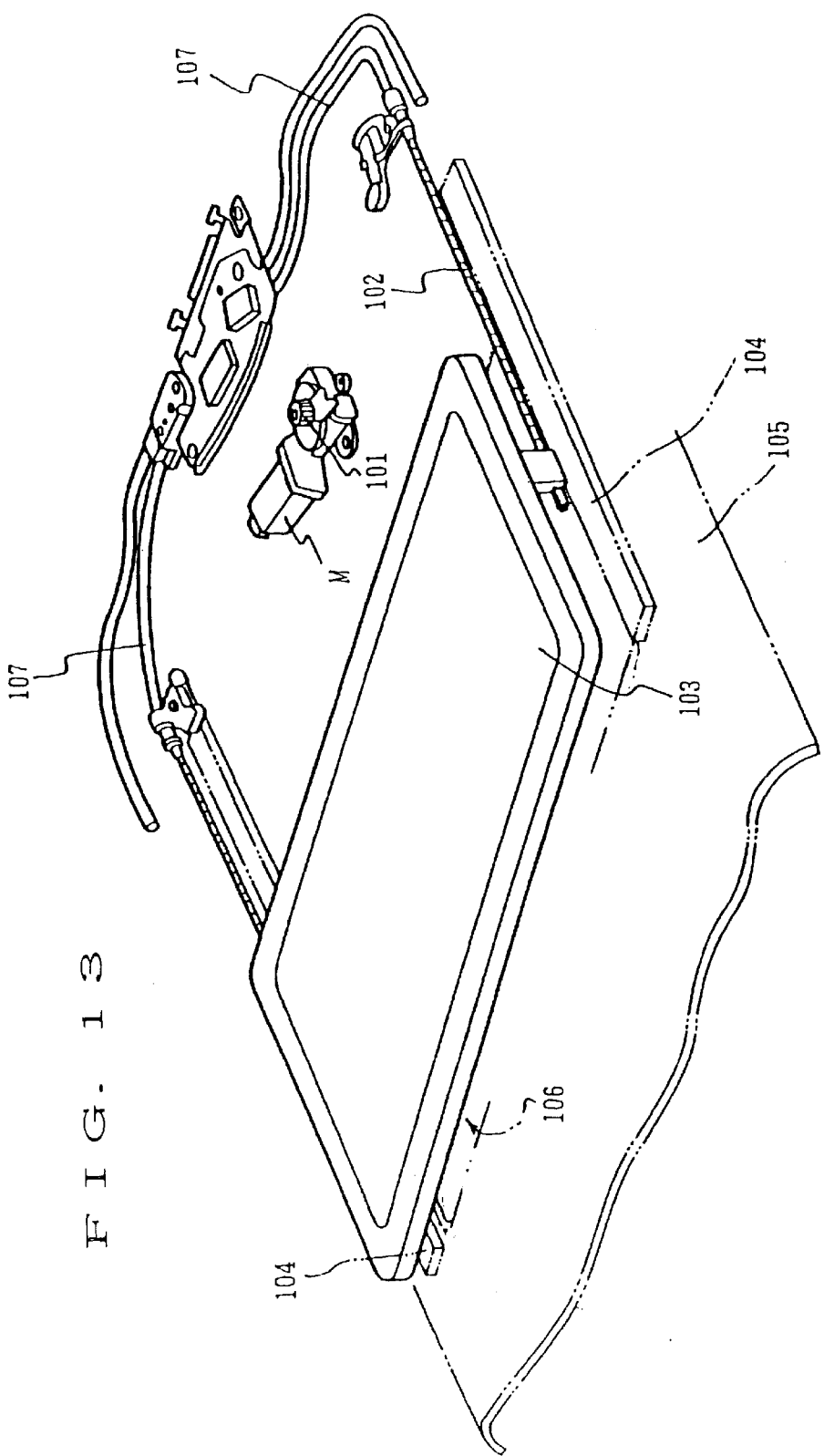
FIG. 13 is an exploded perspective view showing one of prior-arts of opening and closing device.
Figure 14:
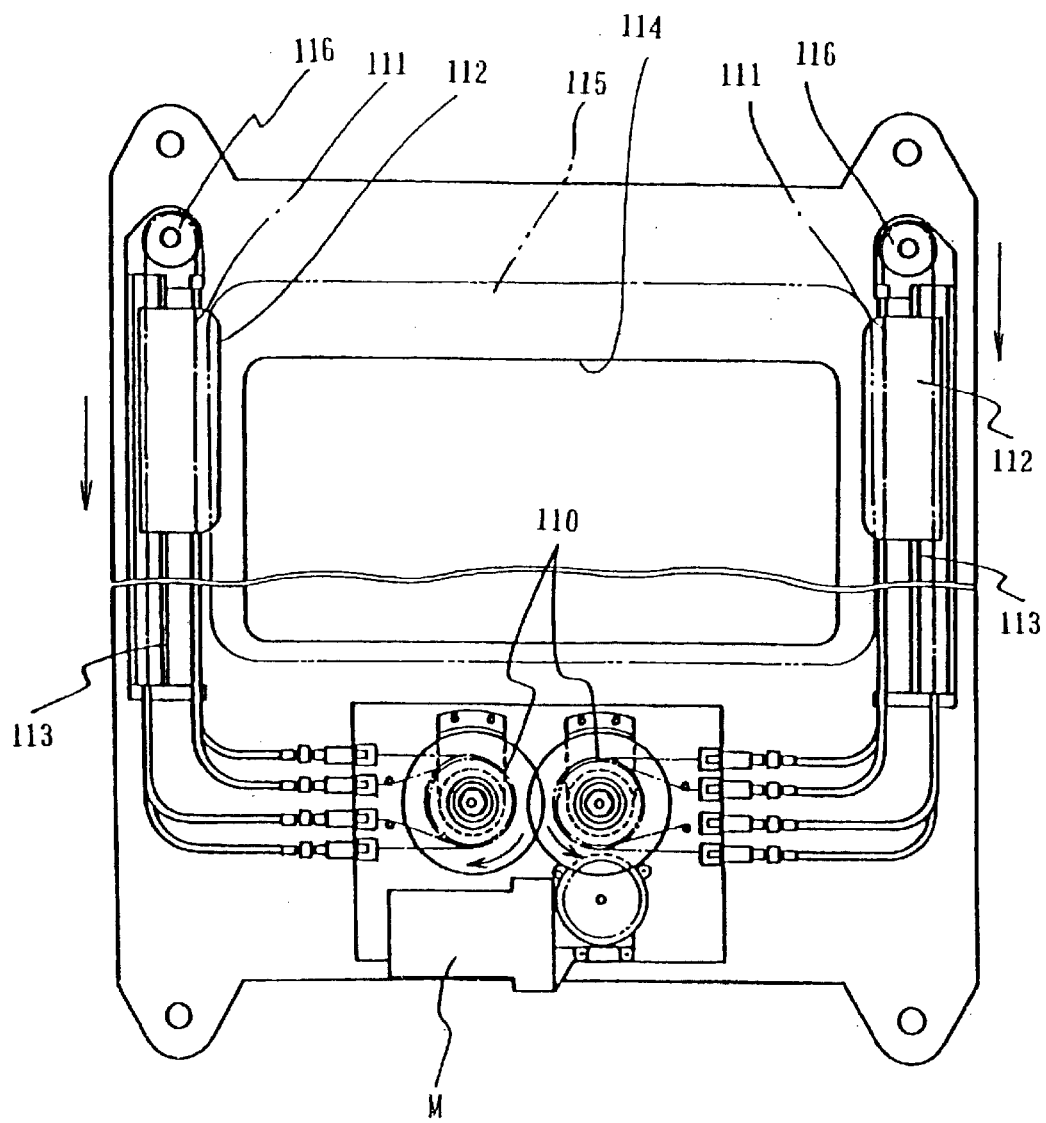
FIG. 14 is a plan view showing another example of the prior-art device.

Although a cable tension-adjusting mechanism shown in FIG. 8 serves to move the pulley 28 where the cable 26 is reversed in direction, it can be used to adjust the cable tension automatically by a cable drive mechanism as shown in FIG. 12. The cable drive mechanism 36 shown in FIG. 12 comprises a housing 70, a drum 37 held rotary therein, a holder 71 provided at the end portion of the housing, two spacers 72 provided at the ends of the holder 71, outer-ends 73 provided as axially-movable with respect to the holder 71 and the spacer 72, and springs 74 provided between the outer-ends 73 and the spacers 72. At the drum 37, the ends of the two cables 26 for opening and closing the lid etc. of sunroofs are anchored and wound in mutually opposite directions. Note here that in FIG. 12 the motor is not shown that has a built-in speed reducer for rotary-driving the drum 37.

The above-mentioned housing 70 is essentially the same as that used in the prior-art pull-cable drive mechanism. The housing has a hollow portion 76 for housing the drum 37 therein and two grooves 77 for guiding the cables 26, wound onto the drum 37, to the outside. One end of the housing 70 has the above-mentioned holder 71 provided thereon. And the housing has cylindrical holes 78 and 79 formed therein which communicate with the grooves 77. The holder 71 may be formed integrally with the housing 70 or separately. At the inlet/outlet of the holder 71 is provided an engaging step 80 for aligning the spacers 72.

The above-mentioned outer-end 73 is a cylindrical member having a sliding portion 82 to be inserted in the holder 71 holes 78 and 79 in an axially-movable manner, a spring holding portion 84 which continues therefrom via a stopping step 83 and which has a larger diameter than the sliding portion, and a flange 85 provided at the tip. The outer-end 73 has a through hole 86 formed at its center for passing the cables 26 therethrough. The tip side of the through hole 86 provides a conduit fitting portion 87 with a large inner diameter for fitting thereto the end of the conduit, and the base end side has an increasing inner diameter with a slight curvature. This is in order to permit the cables 26 wound onto the drum 37 to smoothly move laterally.

The spacers 72 are each a cylindrical member, one end of which has a fitting height 88 formed thereon for engaging with the engaging step 80. The other end of the spacer has a fitting recess 89 formed therein for engaging with the stopping step 83 of the outer-end 73 and, at the center is formed a through hole 90 for sliding fitting of the sliding portion 82 of the outer-end 73. The above-mentioned spring 74 is a compression coil spring and is disposed around the spring holding portion 84 of the outer-end 73 somewhere between the tip of the spacer 72 and the flange portion 85 of the outer-end 73.

The drive mechanism 36 as constructed above has the outer end 73 as axially movable, to be energized by the spring 74 so as to move away from the housing 70 always. Therefore, any elongation or loosening of the cables 26 caused by elastic or permanent deformation can be accommodated by the spring 74 which energizes the outer-end 73 to move axially, thus recovering the tension on the cables 26.

Also, the cable drive mechanism used in a pull-cable type device for opening and closing sunroofs etc. provedes a large amount of cable elongation, so that in order to absorb a necessary amount of elongation, the outer-end 73 must have a large stroke, thus leading to need to have a large lapping margin for the outer-end 73 and the holder 71. This drive mechanism 36 has the spacers 72 and the outer end 73 which is larger than an ordinary one, so that a sufficiently large lapping margin can be obtained, thus providing a large stroke of the outer-end 73. Moreover, by appropriately selecting the length of the spacer 72 and the outer-end 73, it is possible to absorb even larger elongation of the cables.

The components other than the spacers 72 and the outer-end 73, for example the housing 70 and the holder 71 can be shared in use with the components of the window regulator's cable drive mechanism.

Although the above-mentioned embodiments have employed flexible conduits for use with pull-control cables as the conduit 30, a rigidity conduit such as a metal pipe may be used instead. Also, a clamping-preventing mechanism which can prevent that the lid clamps human body or any object when the lid is moved to close the opening, for example, by detecting an abnormal level of tension on the cable 26 and stopping the motor M immediately or rotating the motor M in the inverse direction in some extent. Also, although the above-mentioned embodiments have disclosed the device for opening and closing the roof lid of the sunroof, it may be used as an opening and closing device for opening and closing a sliding window or a sliding door or even a vertically sliding window.

What is claimed is:

1. A pull-cable type opening and closing device for sunroofs and the like, the device comprising:

a pair of rails disposed in parallel with each other;

a lid reciprocating along said rails in order to open an close an opening;

right and left pull-cables which are engaged with said lid and are arranged along said rails; and a drive mechanism for driving said pull cables in a reciprocating manner, wherein the pull-cables are in a closed loop arrangement in which one of the pull cables coming out of said drive mechanism is arranged along the rails from a base end side of a first rail to a tip side thereof and, somewhere along the rails, engaged to the lid and then arranged from the tip side of the first rail to a base end side of a second rail along a route bypassing the opening and then from the base end side of the second rail to a tip side thereof along the rails and, somewhere along the rails, engaged to the lid and then from the tip side of the second rail along a route bypassing the opening back to the drive mechanism, and wherein said pull-cable is arranged from the tip side of the first rail to the tip side of the second rail and then along the second rail from the base end side thereof and, at the base end, reversed in direction to be arranged to the tip side and returned from the tip side of the second rail back to the tip side of said first rail and then, along the first rail, back to the base end side thereof.

2. The opening and closing device according to claim 1, wherein said pull-cable is arranged from the tip side of the first rail to the tip side of the second rail using a conduit and then along the second rail from the base end side thereof and, at the base end, reversed in direction to be arranged to the tip side and returned from the tip side of the second rail using a conduit back to the tip side of said first rail and then, along the first rail, back to the base end side thereof and guided by a flexible conduit between the base end side of the first rail and the drive mechanism.

3. The opening and closing device according to claim 1, wherein said pull-cables are reversed in direction at the tip side of the first rail to be arranged along the first rail to the base end thereof and then to the base end side of the second rail using a conduit and also reversed in direction at the tip side of the second rail to be returned along second rail back to the base end thereof and guided by a flexible conduit between the base end side of each of the rails and the drive mechanism.

4. The opening and closing device according to claim 1, wherein said first rail and/or said second rail have an open cross-sectional portion for passing therethrough one of the pull-cables that is engaged with the lid and a closed cross-sectional portion for gliding in a sliding manner the other of the pull-cables that is not engaged with the lid.

5. The opening and closing device according to claim 1, wherein said first rail and/or said second rail of the rails have a pulley provided thereon in a rotary manner for reversing the pull-cables in direction and, near the pulley, a guide for making a spacing between the pull-cables stretched over the pulley smaller than a diameter of the pulley.

6. The opening and closing device according to claim 1, wherein at an end of said first rail and/or said second rail of said rails, a pulley for reversing the pull-cables in direction is provided in a rotary manner and also in such a manner as to be adjusted in position in a direction of the rails.

7. A pull-cable type opening and closing device for sunroofs and the like, the device comprising:

a pair of rails disposed in parallel with each other;

a lid reciprocating along said rails in order to open an close an opening;

right and left pull-cables which are engaged with said lid and are arranged along said rails; and a drive mechanism for driving said pull cables in a reciprocating manner, wherein the pull-cables are in a closed loop arrangement in which one of the pull cables coming out of said drive mechanism is arranged along the rails from a base end side of a first rail to a tip side thereof and, somewhere along the rails, engaged to the lid and then arranged from the tip side of the first rail to a base end side of a second rail along a route bypassing the opening and then from the base end side of the second rail to a tip side thereof along the rails and, somewhere along the rails, engaged to the lid and then from the tip side of the second rail along a route bypassing the opening back to the drive mechanism, and wherein at least one of first rail and said second rail have an open cross-sectional portion for passing there through one of the pull-cables that is engaged with the lid and a closed cross-sectional portion for guiding in a sliding manner the other of the pull-cables that is not engaged with the lid, and wherein said open-cross-sectional portion is provided with an elastomer-made lip in a contacting manner for preventing chord oscillation of said pull-cables.

8. The opening and closing device according to claim 1, wherein said pull-cable is arranged using at least one of a conduit and flexible conduit.

* * * * *